(12) United States Patent
Shyu

(10) Patent No.: US 7,492,528 B2
(45) Date of Patent: Feb. 17, 2009

(54) TWO-PIECE TYPE OPTICAL IMAGING LENS

(75) Inventor: San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 11/980,709

(22) Filed: Oct. 31, 2007

(65) Prior Publication Data
US 2008/0239511 A1    Oct. 2, 2008

(30) Foreign Application Priority Data
Apr. 2, 2007    (TW) .............................. 96205340 U

(51) Int. Cl.
*G02B 3/02*    (2006.01)
*G02B 13/18*    (2006.01)
*G02B 9/06*    (2006.01)
*G02B 9/08*    (2006.01)

(52) U.S. Cl. ...................... 359/717; 359/794

(58) Field of Classification Search ................ 359/717, 359/718, 793, 794
See application file for complete search history.

(56) References Cited

U.S. PATENT DOCUMENTS 5,600,493 A * 2/1997 Katsuma ..................... 359/717
6,813,095 B2 * 11/2004 Chen .......................... 359/717
7,372,639 B2 * 5/2008 Kim ........................... 359/717

* cited by examiner

*Primary Examiner*—Scott J Sugarman
(74) *Attorney, Agent, or Firm*—Troxell Law PLLC

(57) ABSTRACT

A two-piece type optical imaging lens that includes a first lens element with positive refractive power, a second lens element with positive refractive power, an IR cut-off filter and an image sensor arranged along an optical axis in order from an object side. The first lens element and the second lens element are both meniscus aspherical molded glass lens while a convex surface of the first lens element is on the object side and a convex surface of the second lens is on the image side. The two-piece type optical imaging lens satisfies following conditions: $0.4f \leq d < 0.9f$, $0.5f \leq |R3| \leq 100f$, $5 < |f2|/|f1| < 15$, and $20 \leq Vd \leq 60$, wherein f is an effective focal length of the whole imaging lens, d is the distance between a convex surface on the object side of the first lens element and a convex surface on the image side of the second lens element, R3 is a radius of curvature of the object side of the second lens element, f1 is an effective focal length of the first lens element, f2 is an effective focal length of the second lens element and Vd is Abbe's number of the first lens element as well as the second lens element. Thus the lens has high resolution and minimized total length so that the lens volume is reduced and so does the cost. Therefore, the lens according to the present invention is more widely applicable.

10 Claims, 10 Drawing Sheets

US 7,492,528 B2

TWO-PIECE TYPE OPTICAL IMAGING LENS

BACKGROUND OF THE INVENTION

The present invention relates to a two-piece type optical imaging lens, especially to an optical imaging lens for mobile phones or image sensors such as CCD (Charge Coupled Device) or CMOS (Complementary Metal Oxide Semiconductor) formed by a two piece of lens with features of high performance, minimized total length and low cost.

Along with advanced technology, electronics become more compact and multifunctional. Besides digital still cameras, PC (personal computer) cameras, network cameras and mobile phones, even personal digital assistants are equipped with image pick-up devices such as imaging lens. For meeting requirements of easy-carrying and humanization design, the image pick-up device not only need to have good imaging quality but also need to have compact volume and lower cost so as to extend applications thereof. Especially for applications on mobile phones, the requirements above mentioned are much more important.

There are various materials available for producing conventional spherical ground glass lens. Moreover, the spherical ground glass lens is better for correcting chromatic aberration so that it is adapted widely. Yet it's difficult to correct aberrations such as spherical aberration or astigmatism for the spherical ground glass lens with smaller F Number and larger field angle. In order to improve above shortcomings of conventional spherical ground glass lens, aspherical plastic lens or aspherical molded glass lens is applied to the image pick-up devices available now so as to obtain better imaging quality. For example, refer to the lenses disclosed in U.S. Pat. No. 6,813,095, optical image pick-up lens, U.S. Pat. No. 6,031,670, wide-angle lens or Japanese patent P2001-183578A, imaging lens etc.

However, the total length of the above image capturing devices is still too long. For example, in the lens set disclosed in Japanese patent P2001-183578A, imaging lens, the distance d between a first surface of the first lens element and a second surface of the second lens element is no less than 0.9f ($d \geq 0.9f$, f is an effective focal length of an optical lens assembly according to the present invention) so that the volume of the lens can't be reduced. Neither does the cost. Such kind of design can't satisfy compact and light requirements of electronics. Furthermore, applications of such lens are limited severely, especially on mobile phones.

SUMMARY OF THE INVENTION

It is therefore a primary object of the present invention to provide a two-piece type optical imaging lens that includes a first lens element with positive refractive power, a second lens element with positive refractive power, an IR cut-off filter and an image sensor arranged along an optical axis in order from the object side. The first lens element and the second lens element are both meniscus aspherical lens while the convex surface of the first lens element is on the object side and the convex surface of the second lens is on the image side. Moreover, the two-piece type optical imaging lens satisfies following conditions: $0.4f \leq d < 0.9f$, $0.5f \leq |R3| \leq 100f$, $5 < |f2|/|f1| < 15$, and $20 \leq Vd \leq 60$, wherein f is an effective focal length of the whole imaging lens; d is the distance between the convex surface on the object side of the first lens element and the convex surface on the image side of the second lens element; R3 is a radius of curvature of the object side of the second lens element, f1 is an effective focal length of the first lens element, f2 is an effective focal length of the second lens element and Vd is Abbe's number of the first lens element as well as the second lens element. Thereby a two-piece type optical imaging lens with high resolution and minimized total length is formed so as to effectively minimize total length of the imaging lens for increasing applications of the imaging lens.

It is another object of the present invention to provide a two-piece type optical imaging lens in which a pre-aperture is disposed on the optical lens. An aperture stop is arranged on or in front of the convex object-side surface of the first lens element so as to effectively minimize total length of the lens for increasing applications of the imaging lens.

It is a further object of the present invention to provide a two-piece type optical imaging lens in which a middle-aperture is disposed on the optical lens. An aperture stop is arranged on the concave image-side surface of the first lens element or on the concave object-side surface of the second lens element or between the concave image-side surface of the first lens element and the concave object-side surface of the second lens element so as to effectively minimize total length of the lens for increasing applications of the imaging lens.

It is a further object of the present invention to provide a two-piece type optical imaging lens in which the first lens element and the second lens are designed to utilize plastic lens or molded glass lens so as to increase applications of the imaging lens.

DETAILED DESCRIPTION OF THE PREFERRED EMBODIMENT

Figure 2:
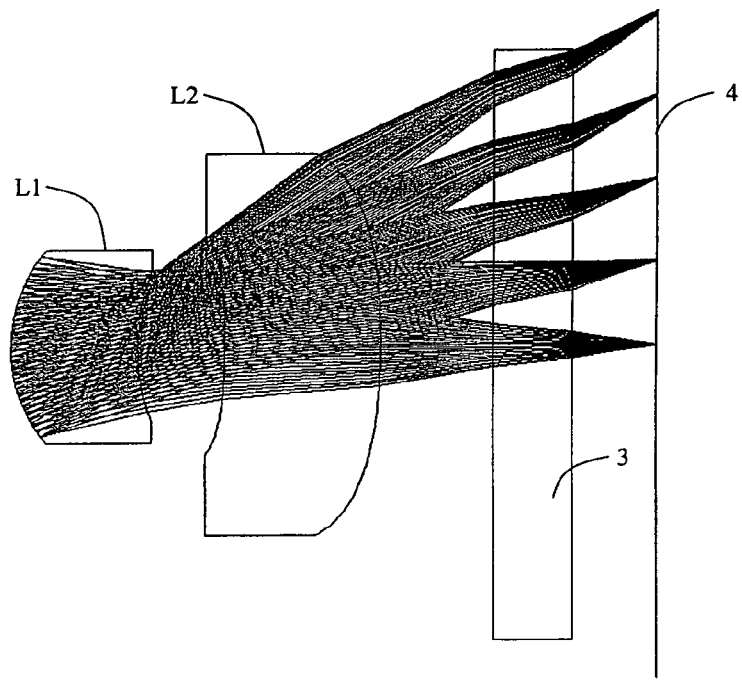
FIG. 2 is a schematic drawing of a light path of an embodiment according to the present invention.
Figure 3:
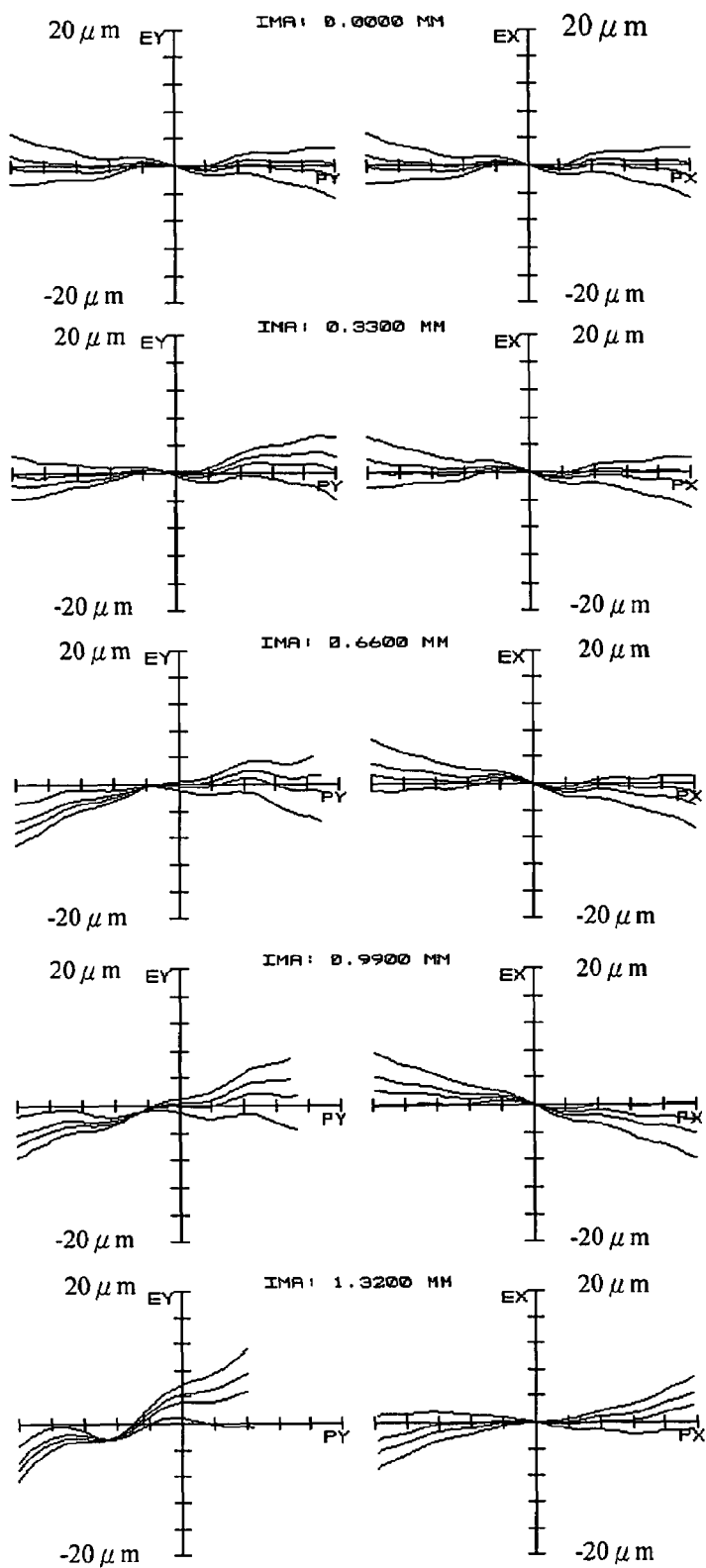
FIG. 3 is a transverse ray fan plot in different field (true image size 0, 0.33, 0.66, 0.99, 1.32 mm) of an embodiment according to the present invention.
Figure 5:
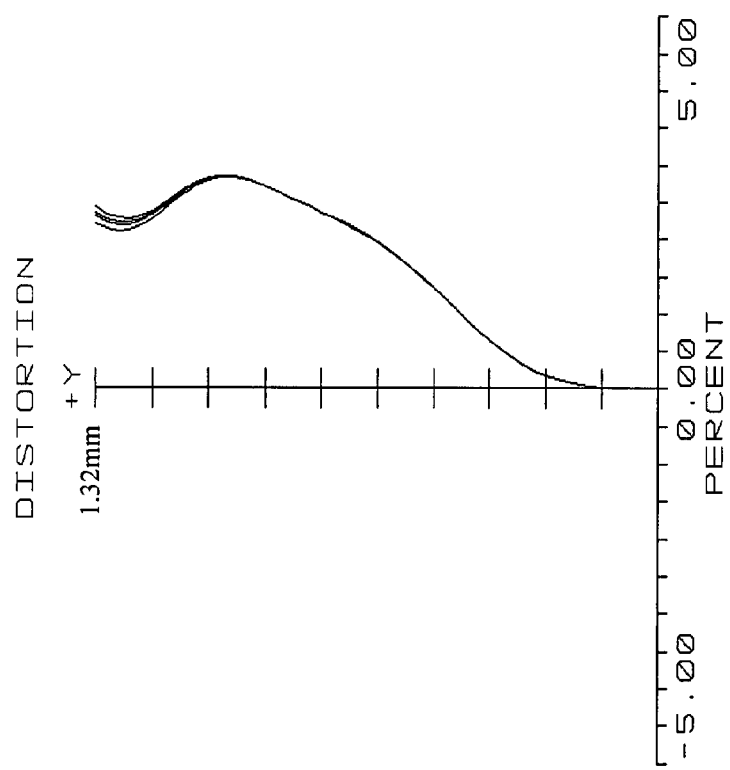
FIG. 5 shows distortion of an image of an embodiment according to the present invention.
Figure 4:
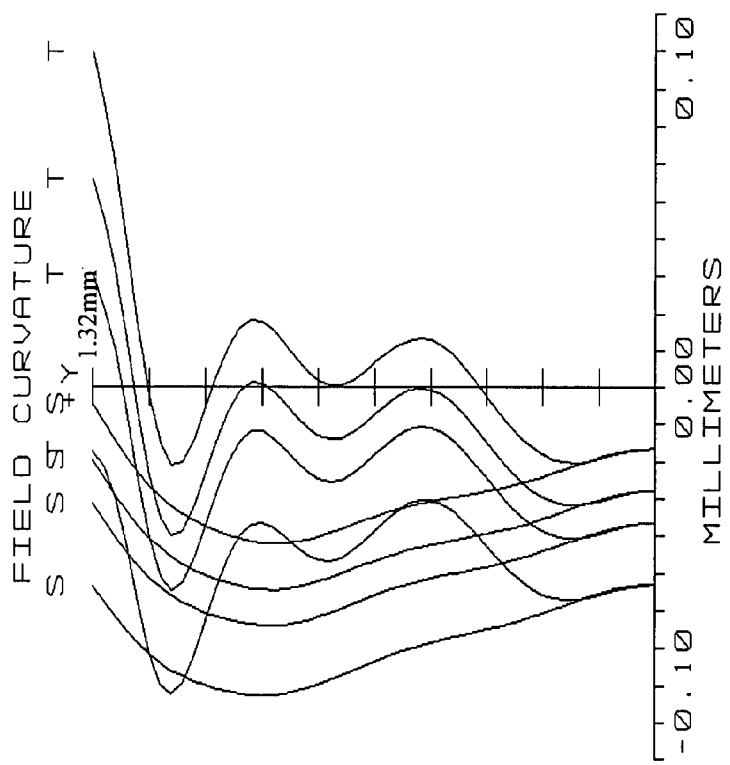
FIG. 4 shows field curvature of an image of an embodiment according to the present invention.
Figure 6:
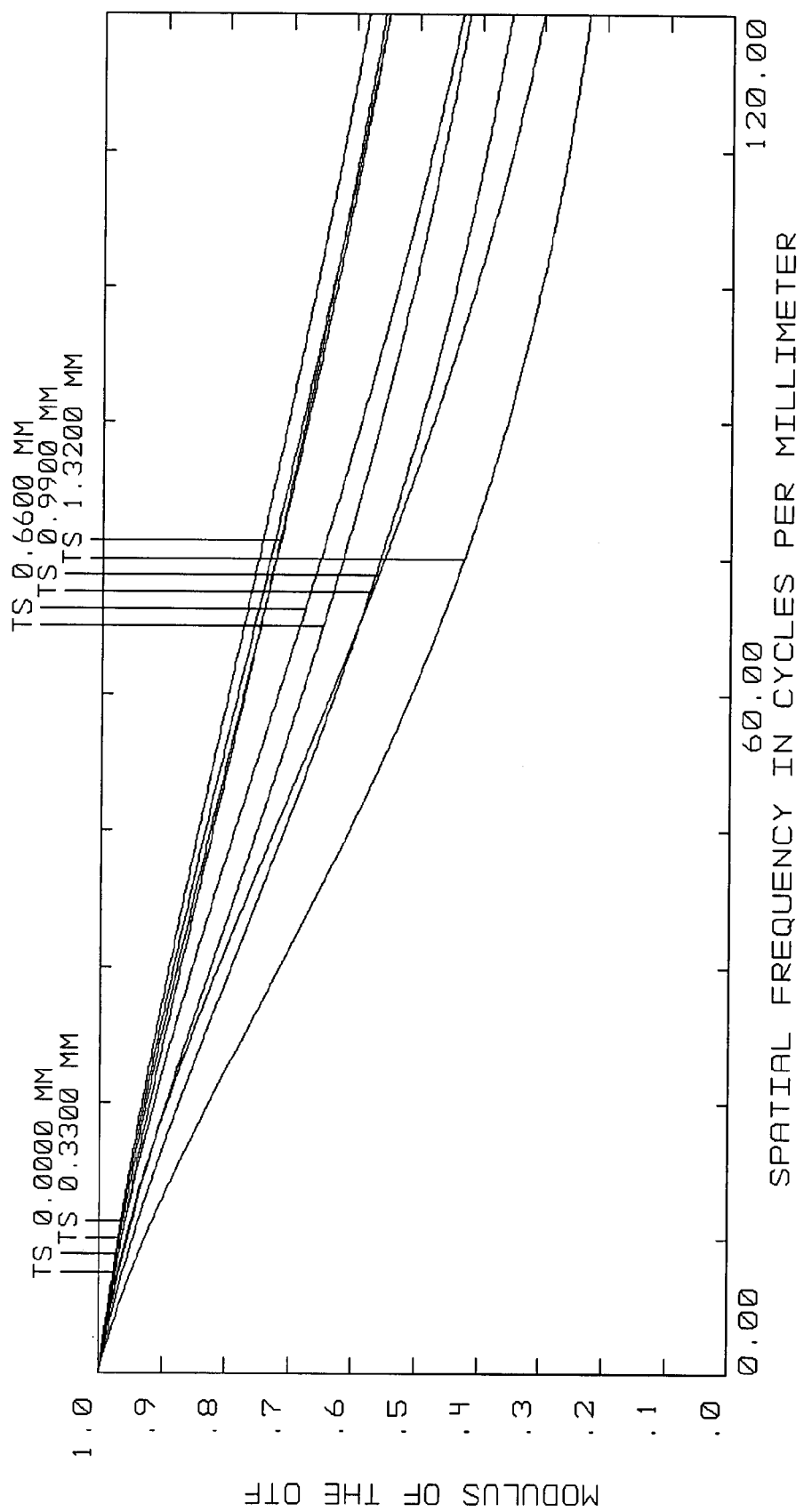
FIG. 6 shows modulation transfer function of an embodiment in five different fields (true image size 0, 0.33, 0.66, 0.99, 1.32 mm) corresponding to spatial frequency ranging from 0 to 120LP/mm.
Figure 7:
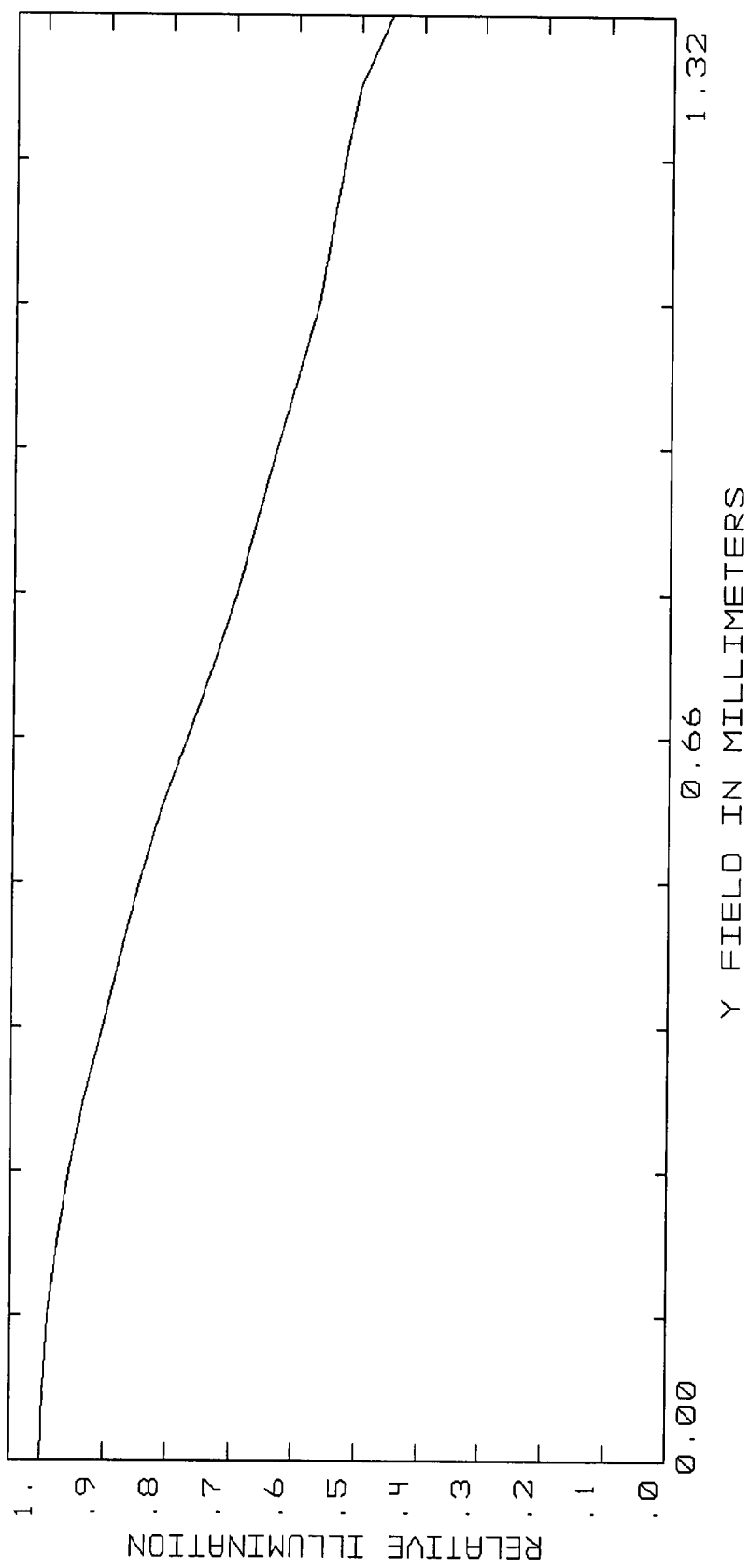
FIG. 7 is a graph showing relative illumination generating by full field toward zero field of another embodiment according to the present invention.
Figure 8:
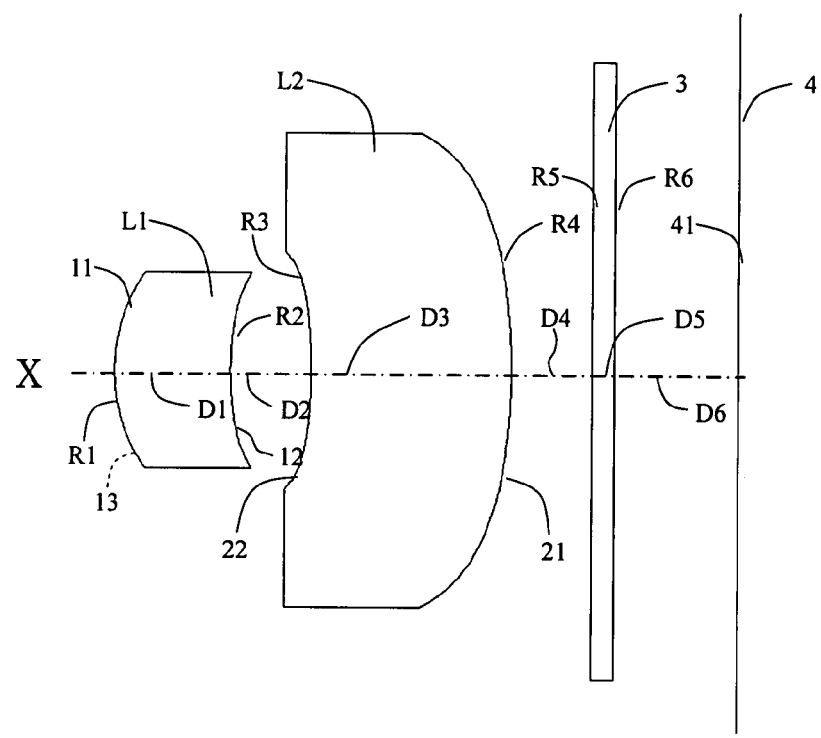
FIG. 8 is a schematic drawing of an optical structure of another embodiment according to the present invention.
Figure 9:
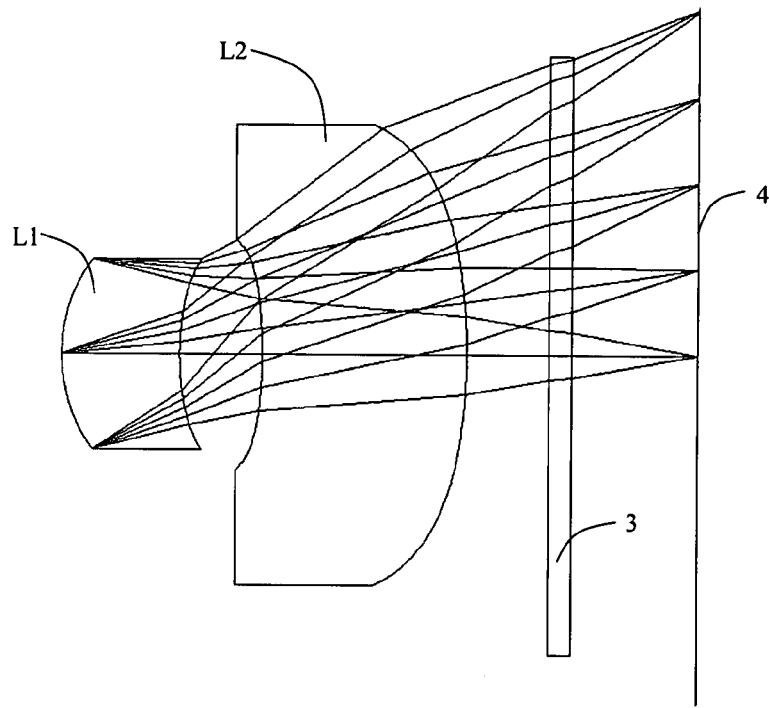
FIG. 9 is a schematic drawing of a light path of another embodiment according to the present invention.
Figure 10:
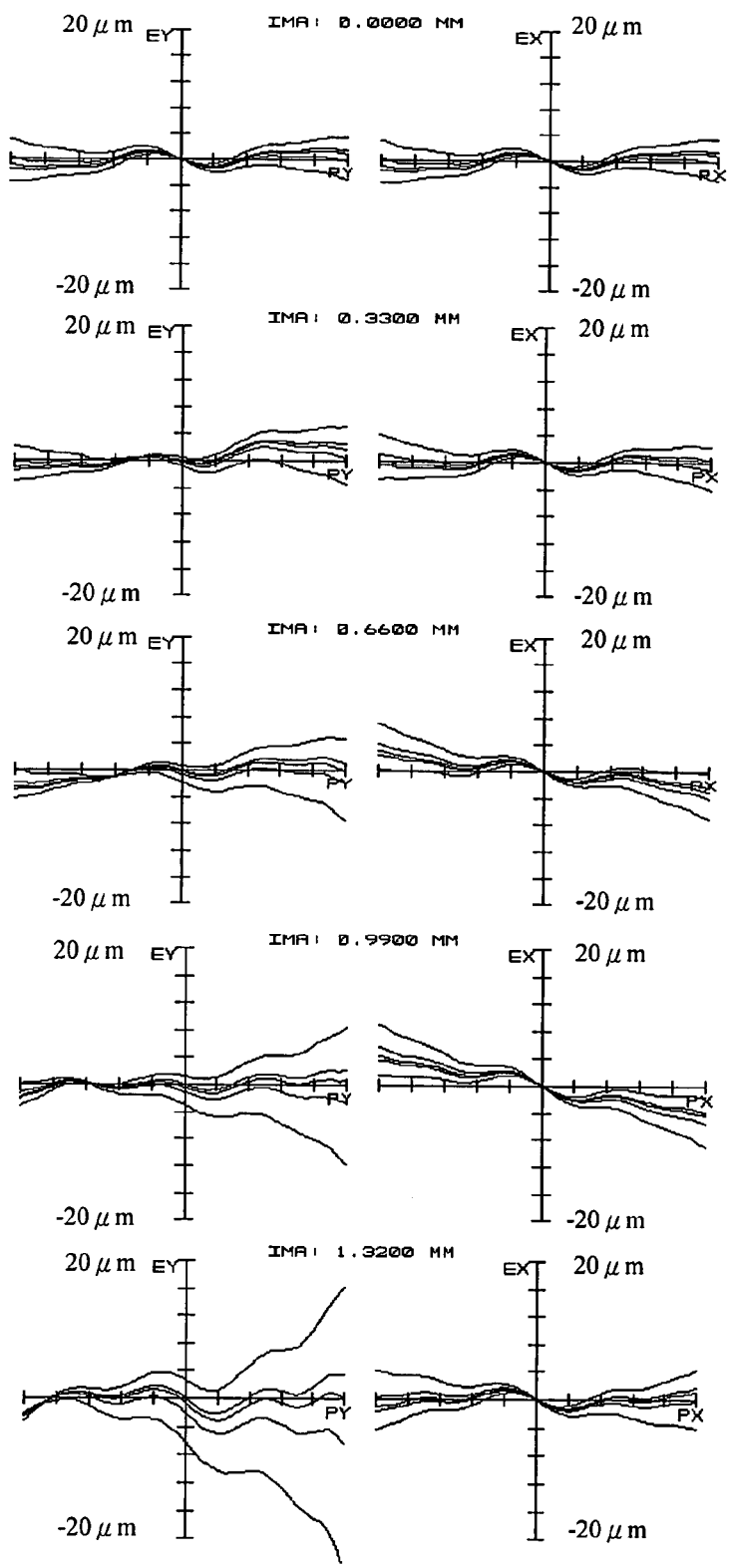
FIG. 10 is a transverse ray fan plot in different field (true image size 0, 0.33, 0.66, 0.99, 1.32 mm) of another embodiment according to the present invention.
Figure 11:
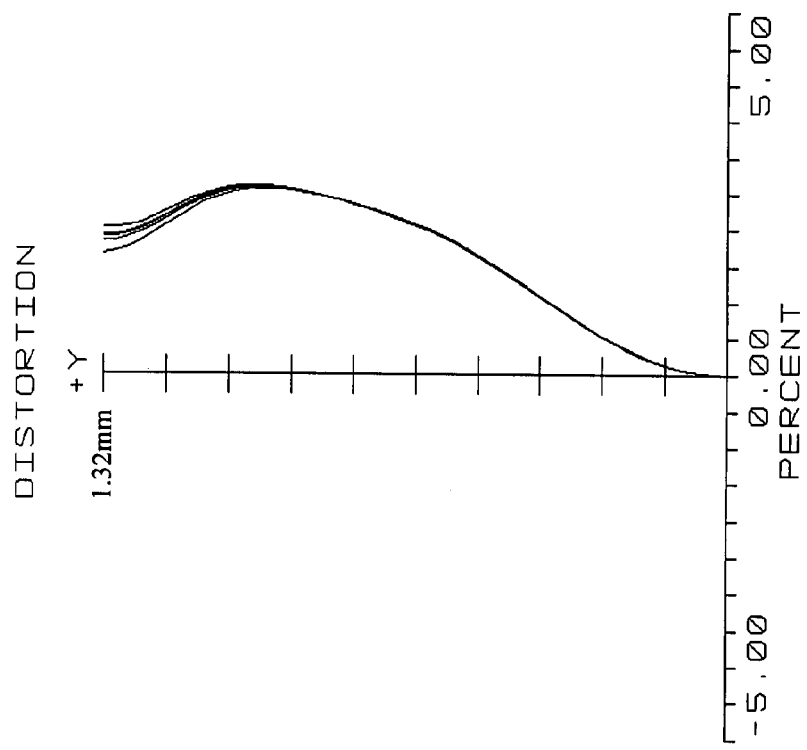
FIG. 11 shows field curvature of an image of another embodiment according to the present invention.
Figure 12:
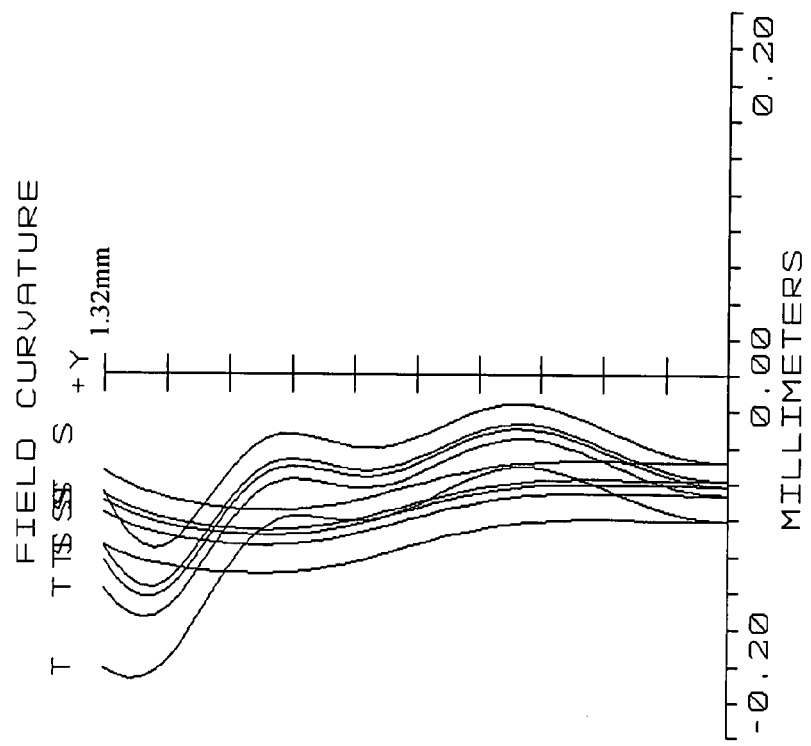
FIG. 12 shows distortion of an image of another embodiment according to the present invention.
Figure 13:
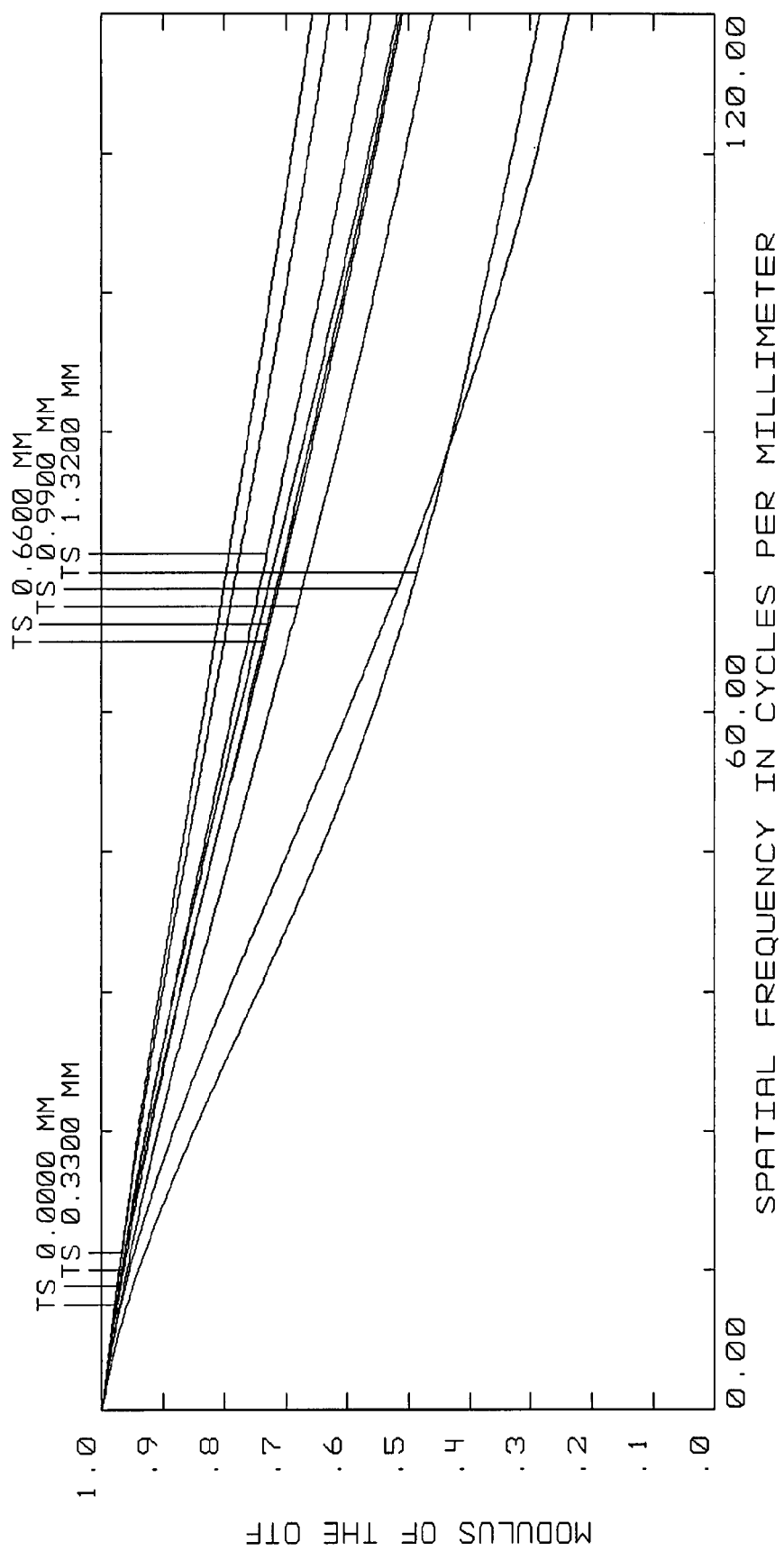
FIG. 13 shows modulation transfer function of another embodiment in five different fields (true image size 0, 0.33, 0.66, 0.99, 1.32 mm) corresponding to spatial frequency ranging from 0 to 120 LP/mm.
Figure 14:
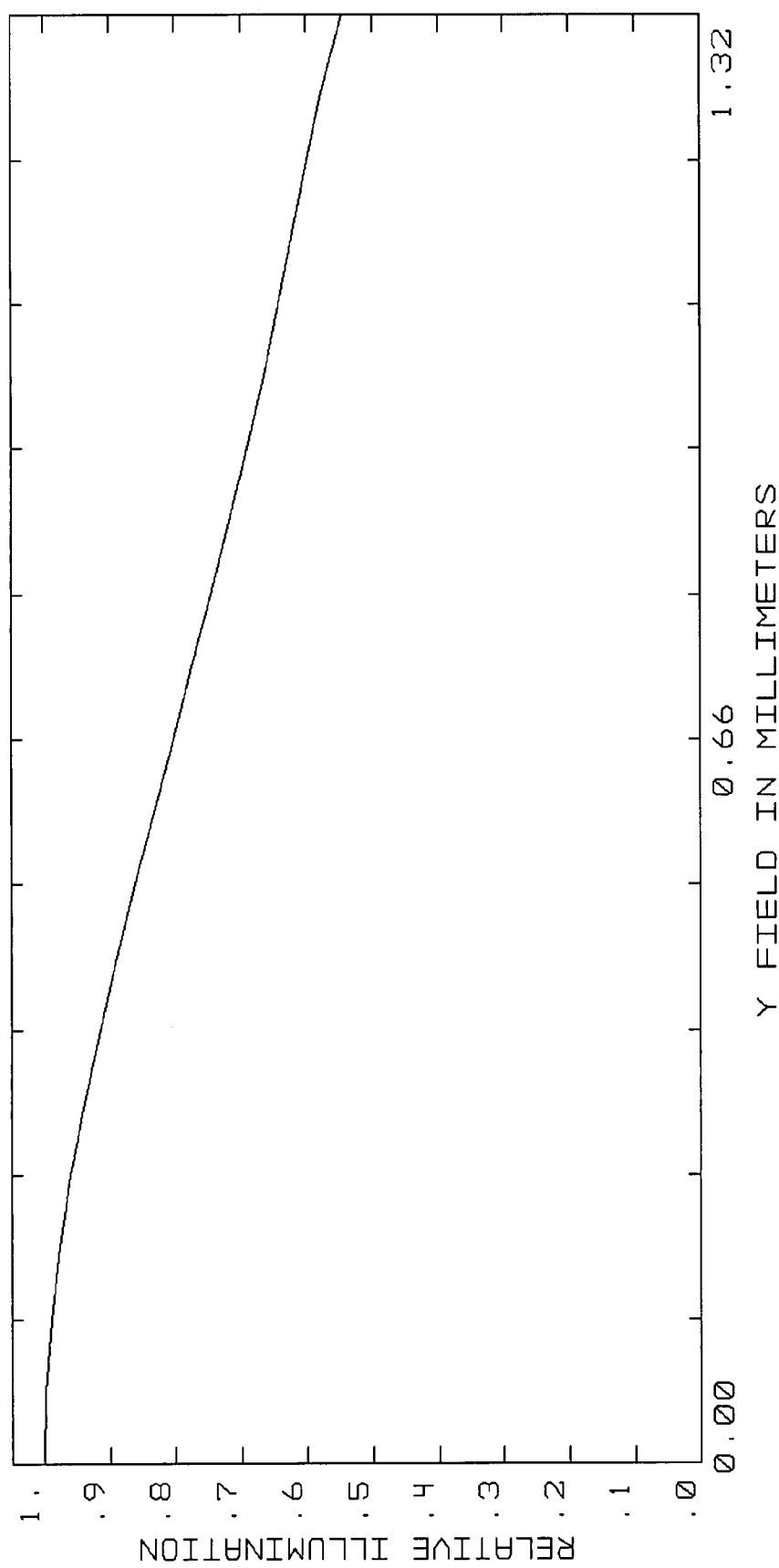
FIG. 14 is a graph showing relative illumination generating by full field toward zero field of another embodiment according to the present invention.

A two-piece type optical imaging lens according to the present invention includes a first lens element with positive refractive power L1, a second lens element with positive refractive power L2, an IR(infrared) cut-off filter 3 and an image sensor 4 arranged along an optical axis in order from an object side. While imaging, firstly light passes the first lens element L1, the second lens element L2 and the IR cut-off filter 3, then an image is formed on a sensing surface 41 of the image sensor 4, as shown in FIG. 2.

Figure 1:
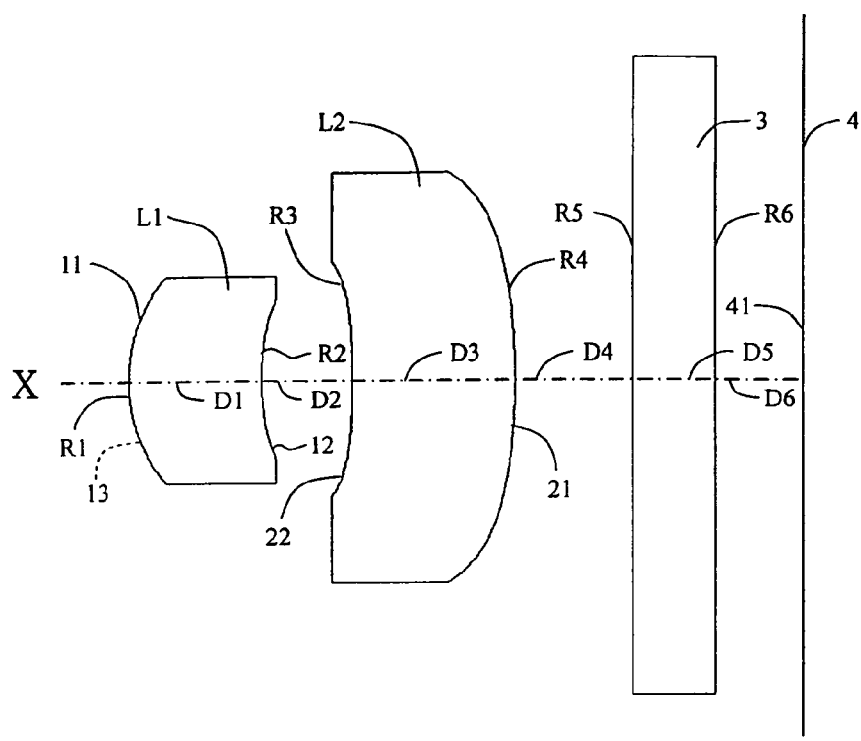
FIG. 1 is a schematic drawing of an optical structure of an embodiment according to the present invention.

The first lens element L1 is a meniscus lens whose convex surface 11 is on the object side while at least one of the convex surface 11 and the concave surface 12 is an aspherical surface. The second lens element L2 is a meniscus lens whose convex surface 21 is on the image side while at least one of the convex surface 21 and the concave surface 22 is an aspherical surface. Moreover, the first lens element L1 and the second lens element L2 are designed to utilize plastic lens or molded glass lens so as to increase applications of the imaging lens. Moreover, a pre-aperture or a middle-aperture is disposed on the optical imaging lens of the present invention. A aperture stop 13 (pre-aperture) is arranged on or upper in front of the convex surface 11 of the object side of the first lens element L1 as shown in FIG. 1 & FIG. 2. A aperture stop (middle-aperture) is arranged on the concave surface 12 of the image side of the first lens element L1 or the concave surface 22 of the object side of the second lens element L2 or between the concave surface 12 and the concave surface 22 (not shown in Figures)

The two-piece type optical imaging lens satisfies following conditions:

$$0.4f \leq d < 0.9f;$$

$$0.5f \leq |R3| \leq 100f$$

$$5 < |f2|/|f1| < 15; \text{ and}$$

$$20 \leq Vd \leq 60$$

wherein f is an effective focal length of the whole optical imaging lens, d is the distance between the convex surface 11 on the object side of the first lens element L1 and the convex surface 21 on the image side of the second lens element L2, R3 is a radius of curvature of the object side of the second lens element L2, f1 is an effective focal length of the first lens element L1, f2 is an effective focal length of the second lens element L2, and Vd is Abbe's number of the first lens element L1 as well as the second lens element L2.

In accordance with the structure mentioned above, the optical imaging lens according to the present invention has features of high resolution and minimized total length so that the optical imaging lens has smaller volume and lower cost, both improving applications of the optical imaging lens.

First Embodiment

Refer to list one, the list includes data of surface number (#) in order from the object side, type of each surface, the radius of curvature R (mm), the on-axis surface spacing D (mm), the refraction rate nd and the Abbe's number Vd of the materials that the lens made of.

List One

| Surf # | Type | R | D | nd, Vd |
|---|---|---|---|---|
| (OBJ) | STANDARD | ∞ | ∞ | |
| 1 (STO) | EVENASPH | 0.6225816 | 0.48 | 1.54556 |
| 2 | EVENASPH | 0.9802095 | 0.33 | |
| 3 | EVENASPH | −3.224123 | 0.6 | 1.54556 |
| 4 | EVENASPH | −2.551759 | 0.433 | |
| 5 | STANDARD | ∞ | 0.3 | 1.5168 64.17 |
| 6 | STANDARD | ∞ | 0.3167179 | |
| (IMG) | STANDARD | ∞ | | |

List 2: Aspheric Coefficients of each Optical Surface

| Conic K | Coeff on A | Coeff on B | Coeff on C | Coeff on D | Coeff on E | Coeff on F | Coeff on G |
|---|---|---|---|---|---|---|---|
| 0 | | | | | | | |
| 0.7974326 | 0.74047981 | 7.9039425 | −119.70395 | 692.06573 | 1858.3745 | 0 | 0 |
| 6.969671 | 0.28703912 | −5.2228976 | 18.022713 | 10.531298 | 0 | 0 | 0 |
| 0 | −0.52058398 | −4.6038488 | 40.285982 | −110.98758 | 0 | 0 | 0 |
| 0 | −0.20477817 | 2.0102653 | −19.449484 | 50.730581 | −120.85408 | 189.24788 | 85.662845 |

Conic and Aspherical Surface Formula:

$$Z = ch^2/\{1+[1-(1+K)\ c^2h^2]^{1/2}\} + Ah^4 + Bh^6 + Ch^8 + Dh^{10} + Eh^{12} + Fh^{14} + Gh^{16}$$

Wherein c is a curvature, h represents height of lens, K is a conic constant, and A, B, C, D, E, F, G respectively are 4th, 6th, 8th, 10th, 12th, 14th, 16th order aspherical coefficient.

The first lens element L1 and the second lens element L2 of the embodiment are made of plastic lens with nd of 1.545 and Vd of 56 while the IR cut-off filter 3 is made of optical glass with nd of 1.5168, Vd of 64.17 and thickness of 0.3 mm.

When the effective focal length f of the whole optical imaging lens according to the present invention is 2.15 mm and distance "d" between the convex surface 11 (object side) of the first lens element L1 and the convex surface 21 (image side) of the second lens element L2 is 1.41 mm, the condition of 0.4f≦d<0.9f is satisfied. When the radius of curvature "R3" of the concave surface 22 (object side) of the second lens element L2 is −3.224123 mm, the condition of 0.5f≦|R3|≦100f is satisfied. When the effective focal length "f1" of the first lens element L1 is 2.125 mm, the effective focal length "f2" of the second lens element L2 is 17.076 mm and |f2|/|f1|=8.036, the condition of 5<|f2|/|f1|<15 is satisfied. When the Abbe's number "Vd" of the first lens element L1 as well as the second lens element L2 is 56, the condition of 20≦Vd≦60 is satisfied. Refer from FIG. 3 to FIG. 7, together with the list one and the list two, it is learned that the total length of the optical lens according to the present invention is 2.45972 mm.

Second Embodiment

Refer to list one, the list includes data of surface number (#) in order from the object side, type of each surface, the radius of curvature R (mm), the on-axis surface spacing D (mm), the refraction rate nd and the Abbe's number Vd of the materials that the lens made of.

List One

| Surf # | Type | R | D | nd, Vd |
|---|---|---|---|---|
| (OBJ) | STANDARD | ∞ | ∞ | |
| 1 (STO) | EVENASPH | 0.6146943 | 0.4563392 | 1.54556 |
| 2 | EVENASPH | 1.089196 | 0.32 | |
| 3 | EVENASPH | −2.331669 | 0.8019809 | 1.58531 |
| 4 | EVENASPH | −2.252521 | 0.32 | |
| 5 | STANDARD | ∞ | 0.09 | 1.5168 64.17 |
| 6 | STANDARD | ∞ | 0.4898221 | |
| (IMG) | STANDARD | ∞ | | |

List 2: Aspheric Coefficients of each Optical Surface

| Conic K | Coeff on A | Coeff on B | Coeff on C | Coeff on D | Coeff on E | Coeff on F | Coeff on G |
|---|---|---|---|---|---|---|---|
| 0 | | | | | | | |
| −0.2847496 | −0.29583399 | 15.225922 | −137.12219 | 877.98444 | −2695.721 | 3115.9967 | 0 |
| 7.86497 | 0.32532839 | −5.7793274 | 60.140459 | −246.99723 | −1496.2938 | −8967.0111 | 0 |
| 11.49785 | −0.12509564 | −0.23024176 | 35.418169 | −705.41872 | 4589.4081 | −11374.327 | 0 |
| 4.907259 | 0.016087259 | −0.24941511 | −0.48996415 | 3.2021391 | −3.05679 | 7.005118 | 2.7576898 |

Conic and Aspherical Surface Formula:

$$Z = ch^2/\{1+[1-(1+K)c^2h^2]^{1/2}\} + Ah^4 + Bh^6 + Ch^8 + Dh^{10} + Eh^{12} + Fh^{14} + Gh^{16}$$

wherein c is a curvature, h represents height of lens, K is a conic constant, and A, B, C, D, E, F, G respectively are 4th, 6th, 8th, 10th, 12th, 14th, 16th order aspherical coefficient.

The first lens element L1 and the second lens element L2 of the embodiment are made of plastic lens. The first lens element L1 is made of plastic lens with nd of 1.545 and Vd of 56. The second lens element L2 is made of plastic lens with nd of 1.585 and Vd of 31. The IR cut-off filter 3 is made of optical glass with nd of 1.5168, Vd of 64.17 and thickness of 0.09 mm.

When the effective focal length f of the whole optical imaging lens according to the present invention is 2.113 mm and distance "d" between the convex surface 11 (object side) of the first lens element L1 and the convex surface 21 (image side) of the second lens element L2 is 1.578 mm, the condition of $0.4f \leq d < 0.9f$ is satisfied. When the radius of curvature "R3" of the concave surface 22 (object side) of the second lens element L2 is −2.332 mm, the condition of $0.5f \leq |R3| \leq 100f$ is satisfied. When the effective focal length "f1" of the first lens element L1 is 1.933 mm, the effective focal length "f2" of the second lens element L2 is 23.932 mm and $|f2|/|f1|=12.381$, the condition of $5<|f2|/|f1|<15$ is satisfied. When the Abbe's number "Vd" of the first lens element L1 as well as the second lens element L2 respectively are 56, 31, the condition of $20 \leq Vd \leq 60$ is satisfied. Refer from FIG. 3 to FIG. 7, together with the list one and the list two, it is learned that the total length of the optical lens according to the present invention is 2.47814 mm.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A two-piece type optical imaging lens comprising:
   a first lens element with positive refractive power that is a meniscus aspherical lens having the convex surface on object side and the concave surface on image side;
   a second lens element with positive refractive power that is a meniscus aspherical lens having the convex surface on image side and the concave surface on object side;
   an IR(infrared) cut-off filter; and
   an image sensor arranged along an optical axis in order from the object side;
   wherein following conditions are satisfied:

$0.4f \leq d < 0.9f$;

$0.5f \leq |R3| \leq 100f$ $5<|f2|/|f1|<15$; and $20 \leq Vd \leq 60$ wherein f is an effective focal length of the optical imaging lens, d is the distance between the object side of the first lens element and the image side of the second lens element, R3 is a radius of curvature of the object side of the second lens element, f1 is an effective focal length of the first lens element, f2 is an effective focal length of the second lens element and Vd is Abbe's number of the first lens element as well as the second lens element.

2. The two-piece type optical imaging lens as claimed in claim 1, wherein at least one of the convex surface and the concave surface of the meniscus first lens element is an aspherical surface.

3. The two-piece type optical imaging lens as claimed in claim 1, wherein at least one of the convex surface and the concave surface of the meniscus second lens element is an aspherical surface.

4. The two-piece type optical imaging lens as claimed in claim 1, wherein a pre-aperture is disposed on the optical imaging lens.

5. The two-piece type optical imaging lens as claimed in claim 4, wherein an aperture stop of the optical imaging lens is arranged on or in front of the convex surface of the object side of the first lens element.

6. The two-piece type optical imaging lens as claimed in claim 1, wherein a middle-aperture is disposed on the optical imaging lens.

7. The two-piece type optical imaging lens as claimed in claim 6, wherein an aperture stop of the optical imaging lens is arranged on the concave image-side surface of the first lens element or on the concave object-side surface of the second lens element or between the concave image-side surface of the first lens element and the concave object-side surface of the second lens element.

8. The two-piece type optical imaging lens as claimed in claim 1, wherein the first lens element is made of optical plastic or molded glass.

9. The two-piece type optical imaging lens as claimed in claim 1, wherein the second lens element is made of optical plastic or molded glass.

10. The two-piece type optical imaging lens as claimed in claim 1, wherein the IR(infrared) cut-off filter is made of glass.

* * * * *